Figure 1:
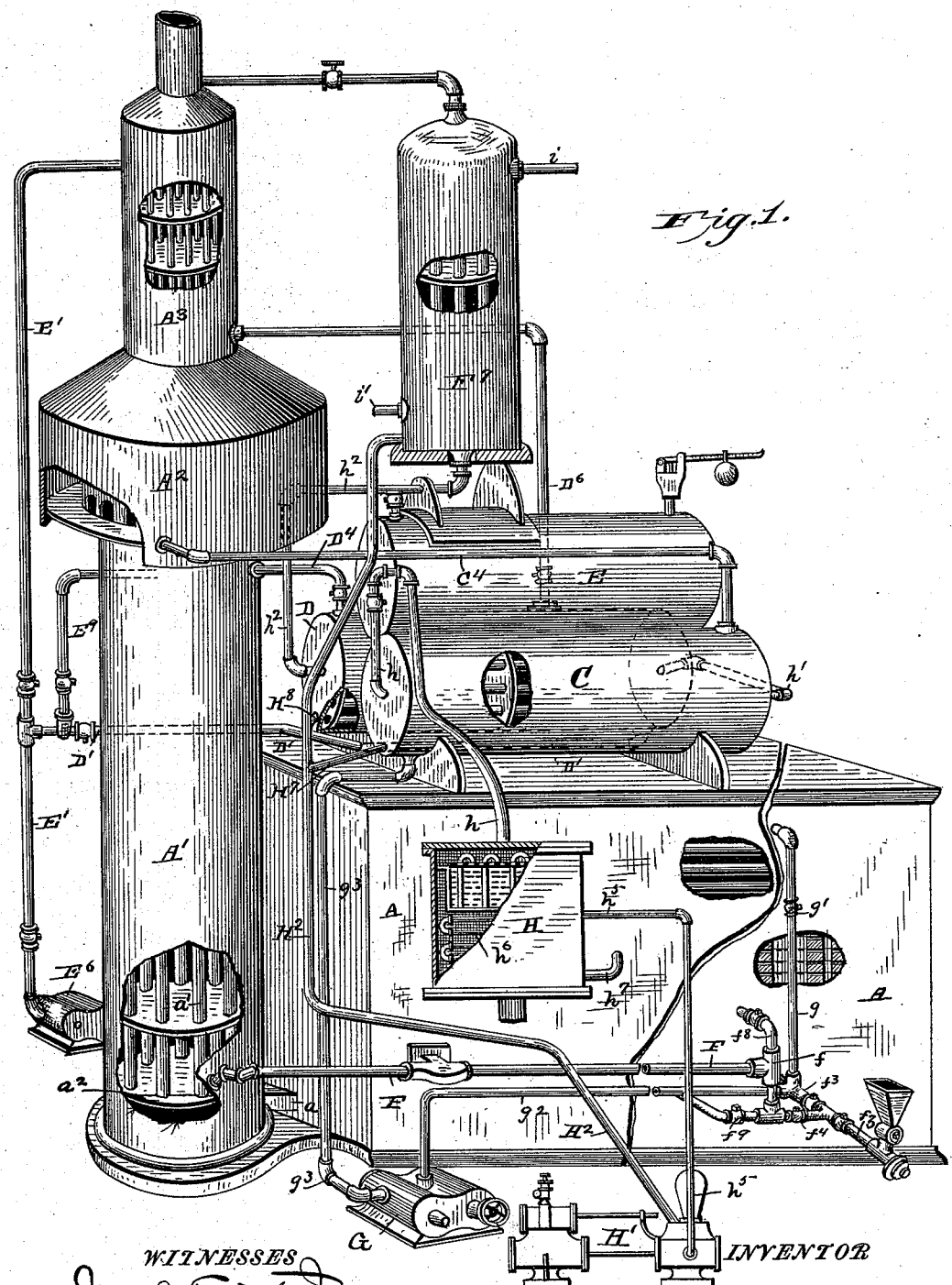

(No Model.) 2 Sheets—Sheet 1.

V. W. BLANCHARD.
STEAM CONDENSER AND AIR HEATER.

No. 413,915. Patented Oct. 29, 1889.

WITNESSES
INVENTOR
Virgil W. Blanchard
by Alexander
Attorney

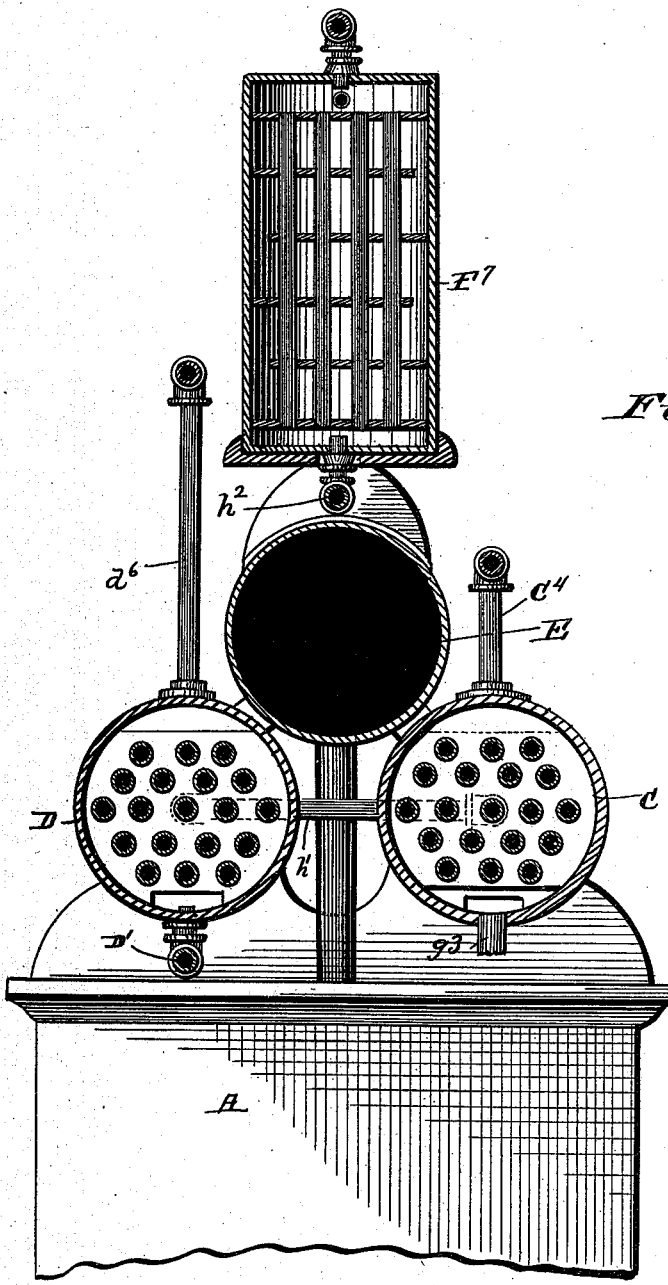

UNITED STATES PATENT OFFICE.

VIRGIL W. BLANCHARD, OF NEW YORK, N. Y., ASSIGNOR TO JOSEPH A. DAVIS, OF SAME PLACE.

STEAM-CONDENSER AND AIR-HEATER.

SPECIFICATION forming part of Letters Patent No. 413,915, dated October 29, 1889.

Application filed April 11, 1889. Serial No. 306,899. (No model.)

*To all whom it may concern:*

Be it known that I, VIRGIL W. BLANCHARD, of New York, in the county of New York and State of New York, have invented certain new and useful Improvements in Steam-Condensers and Air-Heaters for Steam-Boilers; and I do hereby declare that the following is a full, clear, and exact description thereof, reference being had to the accompanying drawings, and to the letters of reference marked thereon, which form part of this specification, in which—

Figure 1 represents a perspective view of my improved steam-boiler-furnace plant, parts of the apparatus being broken away to more clearly indicate the construction. Fig. 2 is a sectional view of the condensers and air-drum.

This invention has for its objects to provide a steam-boiler furnace with novel and improved devices for condensing the exhaust-steam and feeding the resultant water at a heat nearly equaling the boiling-point into the force-pump that supplies the boiler, and to then heat this water of condensation by the exhaust-steam to a temperature at or near the temperature of the exhaust-steam as it leaves the cylinder of the engine, and, further, to provide improved air-heating devices for raising the temperature of the air supplied to the furnace, and, finally, to provide means whereby a portion of the carbonic-acid gas escaping from the furnace may be returned and utilized to regulate the heat of the furnace, or recarbonized and again injected into the combustion-chamber thereof for oxidation.

The invention further consists in certain novel details of construction and arrangement of parts, hereinafter described and claimed.

Referring by letter to the drawings, A designates a rectangular casing, which is formed of heat-non-conducting walls suitably constructed, and which contains a furnace for generating a high degree of heat, and also a steam-generator, preferably of the tubular kind, which furnace and boiler are partly shown by breaking away the walls of casing A.

A' designates the air-heater, which communicates with the casing A by a flue $a$, and which is provided interiorly with numerous vertical pipes $a'$, secured to heads $a^2$, for the passage of the products of combustion, and outside these flues a chamber is formed, broken up by horizontal partitions arranged to cause the descending air-currents, which are forced therethrough, to take a tortuous course, the air being heated in its passage therethrough by contact with the flues $a'$. On top of the air-heater A' is a gas trap or chamber $A^2$, in which the carbonic-acid gas rising with the products of combustion and terminal gases through the chimney is trapped by its greater specific gravity, as fully described in my application for improvements in gas-traps, filed April 6, 1889, Serial No. 306,202. On top of trap $A^2$ is a small air-heater $A^3$, constructed like the heater A', and designed for heating air and as auxiliary to heater $A^3$, as hereinafter set forth.

$E^6$ designates an air-forcing engine provided with a pipe E', leading into the upper end of the heater $A^3$, and having a branch $E^9$, leading into the heater A' near its top. From the lower end of heater A' the air is conducted through a pipe F, under pressure, to a secondary blast-pipe $f$, having a branch $f^8$, leading into the combustion-chamber of the furnace, and a branch $f^9$, leading into the ash-pit, both of said branches being properly valved, so that the attendant can regulate or cut off the air-supply through either branch. The pipe F also communicates with a pipe $f^3$, provided with a hopper and a screw-feeder for pulverized fuel, and a regulating-cock $f^4$. Between the hopper and furnace a pipe $g$ rises from pipe $f^3$, and is provided with a regulating-cock $g'$. Said pipe communicates with the upper part of the furnace, and is used to introduce gases therein, as hereinafter shown.

G designates a forcing and exhausting engine or blower communicating by a valved pipe $g^2$ with the pipe $f^3$, and by means of a pipe $g^3$ with a horizontal gas-heater and steam-condenser C, mounted on top of the casing A. Beside condenser C is a steam-condenser and air-heater D, and each of these is constructed with numerous tubes, tube sheets or heads, and intermediate zigzag channels, like heater A'. Above condensers C D is a steam-drum E, communicating with the boiler, and above this drum a cold-water condenser F⁷.

H designates a water heater and purifier communicating with the exhaust-pipe of the main steam-engine, (not shown,) and by a valved pipe $h$ with the steam-space of condenser C, and this condenser in turn communicates with the steam-space of condenser D by a pipe $h'$, which latter connects by a pipe $h^2$ with the cold-water condenser F⁷. The exhaust-steam entering heater H escapes therefrom into condenser C, end thence into condensers D and F⁷, where its complete condensation is effected, producing, as a result, a partial vacuum, which assists in drawing the steam from heater H. From these several condensers the water of condensation is drawn by pump H' through a pipe H² and branches H⁷ H⁸, as shown. Condenser F⁷ is supplied with a continuous current of cold water introduced therein by a pipe $i$ and conducted off by a pipe $i'$. Pump H' forces the water drawn from the condensers through a pipe $h^5$ into a coil $h^6$ in heater H, from which it escapes by a pipe $h^7$ to the boiler. The steam and water are thus in a closed circuit, the steam passing from the boiler to the engine, being taken thence to the water-heater H, and thence to the condensers, and after reconversion into hot water is forced back into the boiler at a high heat. The water passing through coil $h^6$ is subjected to the heat of the exhaust-steam fresh from the engine at or near the termination of said coil, and is raised to a heat equal or nearly equal to that of the exhaust-steam. The other chamber in condenser C communicates by a pipe C⁴ with the bottom of gas-trap A², and also with a blower-engine G, which in turn communicates by pipe $g^2$ with the pipes $f^3$ and $g^3$. These pipes are so valved that the gas forced through pipe C may be directed into pipe $g^3$ or into pipe $f^3$ and into branch pipe $f$ to mingle with the air, or forced beneath the grate independently of the air-blast. The carbonic-acid gas removed from the trap is cool and assists in condensing the steam in its passage through condenser C, and is in turn heated thereby.

The air-chamber in condenser D is connected at one end by a pipe D' with pipe E' and at its other end by a pipe D⁴ with the upper end of the air-heater A', and it is also connected by a valved pipe D⁶ to the lower end of heater A³. When pump E⁶ is started, air can be forced up into heater A³, through the same into condenser D, through the latter into heater A', and from the latter to the furnace, or by shifting the valves the heater A³ can be cut out of the circuit, or both heater A³ and condenser D may be cut out. I am thus able to effectually heat and regulate the temperature of the air delivered to the furnace. The carbonic-acid gas drawn from the trap may be used to temper the heat of the furnace, but is preferably employed to increase the heat thereof by admitting it beneath the grate and forcing it through the bed of incandescent fuel thereon. In its passage through the latter the carbonic-acid gas is recarbonized and converted into carbonic-oxide gas, which is consumed in the fire-chambers above the grate by introducing oxygen or air therein, thus intensifying the heat of the furnace.

The water-heater herein referred to forms the subject-matter of an application for Letters Patent filed by me April 11, 1889, Serial No. 306,803, and is not herein specifically claimed.

Having thus described my invention, I claim—

1. The combination, with a steam-boiler, of an air-heater A', the steam-condenser and air-heater communicating with heater A', the air-forcing pump, and the water-pump and exhaust-steam supply, all substantially as described.

2. The combination, with the furnace and boiler, of the condensers C D, the pump communicating therewith, and the exhaust-steam supply thereto, with the air-heater A', the gas-trap A², and the pipes connecting the condensers with the heaters and gas-trap, and the engines E⁶ and G, all constructed and arranged substantially as specified.

3. The combination, with the steam-boiler furnace, of the condensers C, D, and F⁷, and the water-heater H, the pump H', communicating with the said condensers and with a coil in heater H, and the exhaust-steam supply to said heater, all substantially as and for the purpose set forth.

4. The combination, in a steam-boiler furnace, of the air-heater A' and gas-trap A², with the steam-condenser C, communicating with the gas-trap and with an exhaust-steam supply, the steam-condenser D, communicating with heater A' and condenser C, and the air, gas, and water forcing engines, all constructed and connected substantially as and for the purpose specified.

5. The combination of the condensers C, D, and F⁷, and the exhaust-steam supply thereto, with the pump H', and the pipe H² and its branches H⁷ H⁸, and the connections between said pump and boiler, all constructed and arranged substantially as specified.

6. The combination, in a steam-boiler furnace, of the air-heaters A' A³, the condensers C and F⁷, the air-pump E⁶, and water-pump H' and heater H, all substantially as and for the purpose set forth.

7. The combination of the heaters A' A³ and gas-trap A², with the condensers C and D, water-heater H, the air and gas forcing engines, and the pump H', substantially as and for the purpose described.

8. The combination, with the steam-boiler furnace and the air-heater and gas-trap, constructed substantially as described, of the air and gas forcing engines, the air and gas supply pipes F and $g^2$, and the valved branch pipes connecting therewith, all constructed and arranged substantially as specified.

9. The combination, with the furnace and boiler, the air-heaters A' $A^3$, and water-heater H, of the gas-trap $A^2$, the condensers C, D, and $F^7$, and the air, gas, and water pumps, and pipe-connections, all substantially as and for the pupose set forth.

In testimony that I claim the foregoing as my own I affix my signature in presence of two witnesses.

VIRGIL W. BLANCHARD.

Witnesses:
W. R. KEYWORTH,
F. O. McCLEARY.